(12) United States Patent
Shin et al.

(10) Patent No.: US 11,907,949 B2
(45) Date of Patent: Feb. 20, 2024

(54) APPARATUS FOR CONTROLLING VEHICLE UTILIZING FAST IDENTITY ONLINE AND CONTROLLING METHOD THEREOF

(71) Applicants: Hyundai Motor Company, Seoul (KR); Kia Corporation, Seoul (KR)

(72) Inventors: Yong Woo Shin, Gyeonggi-do (KR); Min Woo Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 56 days.

(21) Appl. No.: 17/861,377

(22) Filed: Jul. 11, 2022

(65) Prior Publication Data

US 2023/0131994 A1    Apr. 27, 2023

(30) Foreign Application Priority Data

Oct. 27, 2021    (KR) .................. 10-2021-0144887

(51) Int. Cl.
   *G06Q 20/40*        (2012.01)
   *H04L 12/40*        (2006.01)
(52) U.S. Cl.
   CPC ....... *G06Q 20/40145* (2013.01); *H04L 12/40* (2013.01); *H04L 2012/40215* (2013.01)
(58) Field of Classification Search
   CPC .............................................. G06Q 20/40145
   USPC .......................................................... 705/44
   See application file for complete search history.

(56) References Cited

U.S. PATENT DOCUMENTS

| | | | |
|---|---|---|---|
| 10,504,094 B1 * | 12/2019 | Gaudin | ................. G07F 15/001 |
| 10,540,839 B2 | 1/2020 | Matsuoka et al. | |
| 10,956,908 B2 | 3/2021 | Hollmig | |
| 11,676,014 B1 * | 6/2023 | Hallac | .................... G06Q 10/20 706/12 |
| 2016/0247153 A1 * | 8/2016 | Lesesky | ................. G07C 5/008 |
| 2021/0406893 A1 * | 12/2021 | Calvert | ................ G06Q 20/204 |

FOREIGN PATENT DOCUMENTS

| | | |
|---|---|---|
| JP | 2006-131031 A | 5/2006 |
| JP | 2013-012170 A | 1/2013 |
| JP | 2019-117473 A | 7/2019 |
| KR | 10-1698103 B1 | 1/2017 |
| KR | 10-2017-0076448 A | 7/2017 |
| KR | 10-2021-0052619 A | 5/2021 |
| WO | 2018-218551 A1 | 12/2018 |

* cited by examiner

*Primary Examiner* — William E Rankins
(74) *Attorney, Agent, or Firm* — Fox Rothschild LLP (57) ABSTRACT

An apparatus for controlling a vehicle includes a memory, a network interface, and a processor, where the processor may check whether a fingerprint recognition module in the vehicle supports fast identity online (FIDO), may request for an encryption key to register the FIDO, may encrypt an input pin code to transmit the encrypted pin code to a financial information processing server, may transmit vehicle and account information for the FIDO registration to a FIDO authentication server when receiving an authentication token from the financial information processing server, may generate information on the FIDO registration when receiving policy information from the FIDO authentication server, and may transmit the information on the FIDO registration to the FIDO authentication server.

20 Claims, 6 Drawing Sheets

APPARATUS FOR CONTROLLING VEHICLE UTILIZING FAST IDENTITY ONLINE AND CONTROLLING METHOD THEREOF

CROSS-REFERENCE TO RELATED APPLICATION

This application claims under 35 U.S.C. § 119(a) the benefit of Korean Patent Application No. 10-2021-0144887, filed in the Korean Intellectual Property Office on Oct. 27, 2021, the entire contents of which are incorporated herein by reference.

BACKGROUND

(a) Technical Field

The present disclosure relates to an apparatus for controlling a vehicle utilizing fast identity online (FIDO) and a controlling method thereof, more particularly, to the apparatus for controlling the vehicle to provide an in-vehicle payment function by authenticating FIDO.

(b) Description of the Related Art

An apparatus for controlling a vehicle may provide a payment function for a user to use a service such as parking, refueling and charging an electric vehicle. The apparatus for controlling a vehicle may authenticate the user by using a password and may then approve user payment.

Meanwhile, in a mobile payment environment, the user may be authenticated using a fast identity online (FIDO) authentication method. The FIDO authentication method may be implemented by registering information on a user fingerprint in a mobile terminal, and then authenticating the user by using the information on the registered fingerprint.

It may be inconvenient for a user to proceed with user authentication in a vehicle when authenticating the user by using a password.

SUMMARY

An aspect of the present disclosure provides an apparatus for controlling a vehicle, which may authenticate the user and complete user payment by using fast identity online (FIDO) authentication, and a controlling method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a vehicle includes a memory, a network interface and a processor, wherein the present disclosure checks whether a fingerprint recognition module in the vehicle supports fast identity online (FIDO), requests an encryption key to register the FIDO, encrypts an input pin code to transmit the encrypted pin code to a financial information processing server, transmits vehicle and account information for the FIDO registration to a FIDO authentication server when receiving an authentication token from the financial information processing server, generates information on the FIDO registration when receiving policy information from the FIDO authentication server, and transmits the information on the FIDO registration to the FIDO authentication server.

The processor may check whether a fingerprint recognition function of the vehicle is supported by controller area network (CAN) communication between a head unit, which is included in the vehicle and performs payment, and the fingerprint recognition module.

The processor may receive a public key from the financial information processing server and encrypt the pin code.

The processor may receive a user fingerprint by using the fingerprint recognition module and authenticates the user fingerprint when receiving the policy information, and may generate the information on the FIDO registration by using the user fingerprint.

The processor may check whether a driver is seated by using an occupancy sensor of the driver's seat and then transmit the information on the FIDO registration to the FIDO authentication server.

The processor may determine whether the FIDO is registered and transmit order information and information on the FIDO authentication.

The processor may notify a user that the payment is completed and start a payment time-expiration timer.

The processor may transmit a notification notifying that a product paid for is not used when a payment time on the payment-expiration timer expires.

The processor may inform the FIDO authentication server that information on the registered fingerprint is changed, and may deactivate use of the FIDO by a registered account when receiving an instruction to deactivate the use of the FIDO from the FIDO authentication server.

The processor may transmit the vehicle and account information to the FIDO authentication server to activate use of the FIDO by an account in which the fingerprint is registered, when the fingerprint is registered in advance.

According to another aspect of the present disclosure, a controlling method of a vehicle includes checking whether a fingerprint recognition module in the vehicle supports fast identity online (FIDO), requesting an encryption key to register the FIDO, encrypting an input pin code to transmit the encrypted pin code to a financial information processing server, transmitting vehicle and account information for the FIDO registration to a FIDO authentication server when receiving an authentication token from the financial information processing server, generating information on the FIDO registration when receiving policy information from the FIDO authentication server, and transmitting the information on the FIDO registration to the FIDO authentication server.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the ter in "vehicle" or "vehicular" or other similar term as used herein is inclusive of motor vehicles in general such as passenger automobiles including sports utility vehicles (SLAT), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments of the present disclosure are described in detail with reference to FIGS. 1 to 6.

Hereinafter, it is assumed that an apparatus for controlling a vehicle performs processes shown in FIGS. 1 to 5. It may also be understood that operations described as being performed by the apparatus in the following descriptions with reference to FIGS. 1 to 5 are controlled by a processor 1100 (in FIG. 6 for example) of the apparatus for controlling a vehicle.

Figure 1:
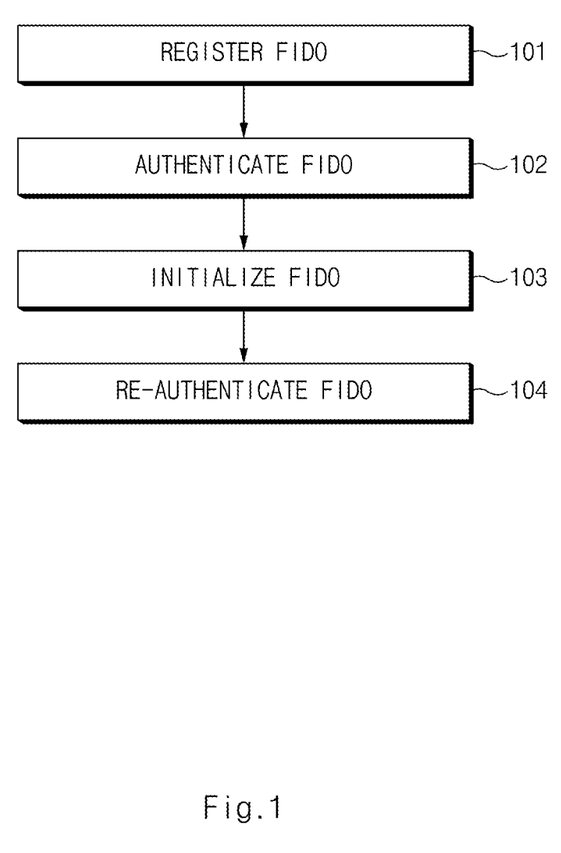
FIG. 1 is a flowchart showing a controlling method of an apparatus for controlling a vehicle according to an embodiment of the present disclosure.

FIG. 1 is a flowchart showing a controlling method of an apparatus for controlling a vehicle according to an embodiment of the present disclosure.

The apparatus for controlling a vehicle may register fast identity online (FIDO) in S101. The apparatus for controlling a vehicle may register information on a user fingerprint registered in the vehicle to a FIDO authentication server as a payment authentication method.

The apparatus for controlling a vehicle may authenticate the FIDO in S102. The apparatus for controlling a vehicle may use the FIDO as a payment method when executing electronic payment in the vehicle after completing the FIDO registration. The apparatus for controlling a vehicle may authenticate the FIDO by using a fingerprint recognition module mounted in the vehicle.

The apparatus for controlling a vehicle may initialize the FIDO in S103. The apparatus for controlling a vehicle may initialize information on the FIDO registration when the fingerprint is deleted from the vehicle or a new fingerprint is registered in the vehicle.

The apparatus for controlling a vehicle may re-authenticate the FIDO in S104. The apparatus for controlling a vehicle may activate the FIDO to be used again in the vehicle in which use of the FIDO is deactivated because the FIDO is initialized.

Figure 2:
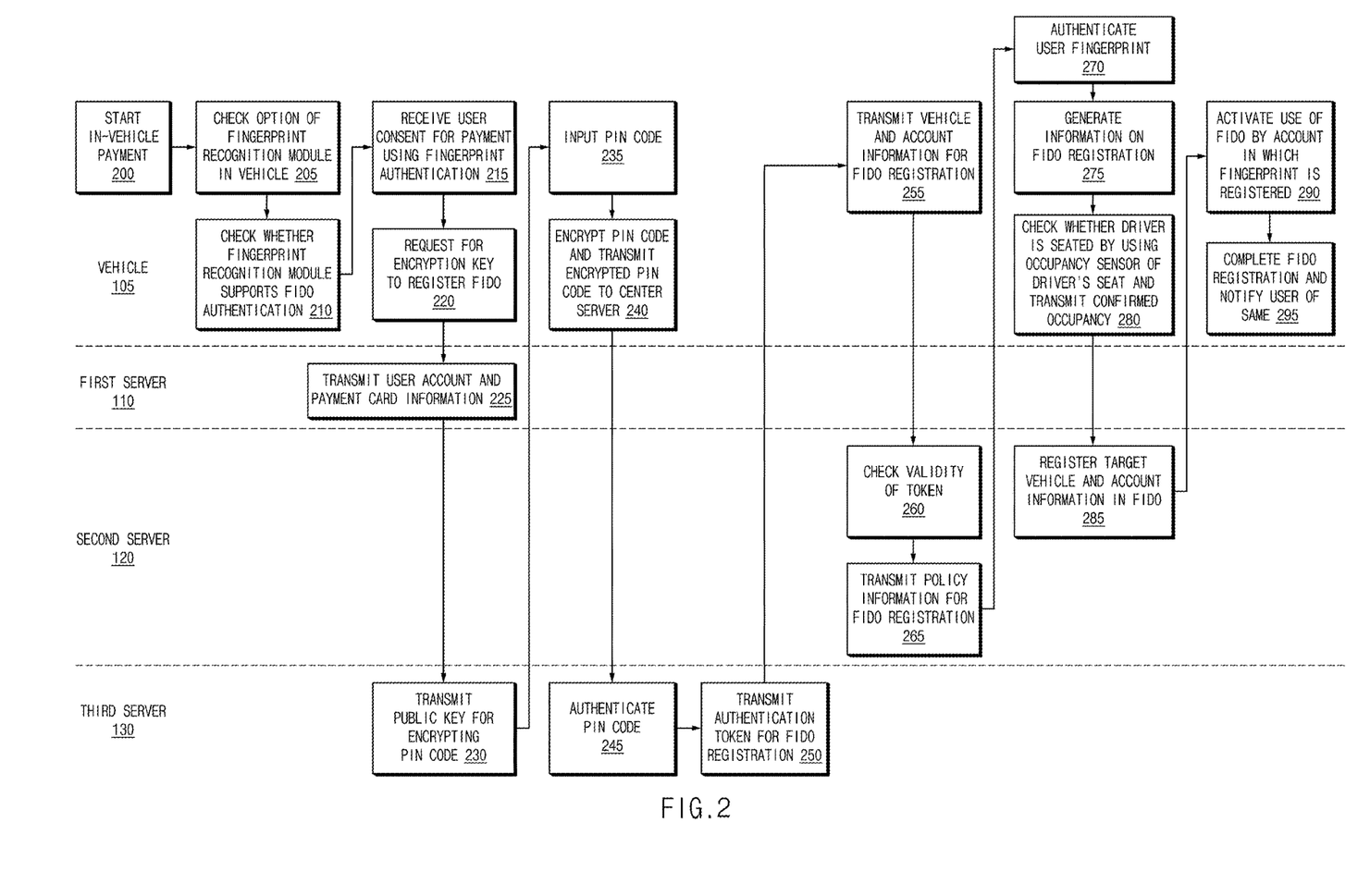
FIG. 2 is a flowchart showing a process in which the apparatus for controlling a vehicle registers fast identity online (FIDO) according to an embodiment of the present disclosure.

FIG. 2 is a flowchart showing a process in which the apparatus for controlling a vehicle registers the FIDO according to an embodiment of the present disclosure.

The apparatus for controlling a vehicle may start in-vehicle payment in S200. The apparatus for controlling a vehicle may start the payment performed in a vehicle 105 to allow a user to use a service such as parking, refueling or charging an electric vehicle.

The apparatus for controlling a vehicle may check an option of the fingerprint recognition module in the vehicle in S205. The apparatus for controlling a vehicle may check the option of the fingerprint recognition module through controller area network (CAN) communication. The apparatus for controlling a vehicle may determine whether a fingerprint recognition function of the vehicle 105 is supported by the communication between a head unit, which is included in the vehicle 105 and performs the payment, and the fingerprint recognition module.

The apparatus for controlling a vehicle may check whether the fingerprint recognition module supports the FIDO authentication in S210. The apparatus for controlling a vehicle may confirm that the vehicle 105 includes the fingerprint recognition module. The apparatus for controlling a vehicle may confirm that the fingerprint recognition module included in the vehicle 105 supports the FIDO authentication.

The apparatus for controlling a vehicle may receive user consent for the payment using the fingerprint authentication in S215. The apparatus for controlling a vehicle may use an input device of the vehicle 105 to receive a user input for authenticating the user by using the fingerprint and for consent to proceed with the payment.

The apparatus for controlling a vehicle may request for an encryption key to register the FIDO in S220. The apparatus for controlling a vehicle may transmit a signal requesting the encryption key to register the FIDO to a first server 110. The first server 110 may be an external server. For example, the first server 110 may be an original equipment manufacturer (OEM) server.

The first server 110 may transmit user account and payment card information to a third server 130 in S225. The third server 130 may be a financial information processing server of a card company or bank. The first server 110 may store the user account and the payment card information. The first server 110 may transmit the user account and the payment card information to the third server 130 when receiving the signal requesting the encryption key.

The third server 130 may transmit a public key for encrypting a pin code to the apparatus for controlling a vehicle in S230. The public key may be used to encrypt the pin code. The third server 130 may store the public key. The third server 130 may transmit the public key to the apparatus for controlling a vehicle when receiving the user account and the payment card information.

The apparatus for controlling a vehicle may receive the pin code in S235. The apparatus for controlling a vehicle may display a user interface (UI) for inputting the pin code on a display of the vehicle 105 when receiving the public key. The apparatus for controlling a vehicle may receive a user input for inputting the pin code by using the input device of the vehicle 105.

The apparatus for controlling a vehicle may encrypt the pin code, and may transmit the encrypted pin code to a center server, i.e. the third server 130 in S240. The apparatus for controlling a vehicle may encrypt the input pin code by using the public key received from the third server 130. The apparatus for controlling a vehicle may directly transmit the encrypted pin code to the third server 130.

The third server 130 may authenticate the pin code in S245. The third server 130 may decrypt the encrypted pin code by using the public key. The third server 130 may check whether the decrypted pin code is the user's own pin code.

The third server 130 may transmit an authentication token for the FIDO registration to the apparatus for controlling a vehicle in S250. The authentication token may be used for the FIDO registration. The third server 130 may store the authentication token. The third server 130 may transmit the authentication token to the apparatus for controlling a vehicle when the authentication of the pin code is completed.

The apparatus for controlling a vehicle may transmit vehicle and account information for the FIDO registration to a second server 120 in S255. The second server 120 may be the FIDO authentication server. The apparatus for controlling a vehicle may transmit the vehicle and account information to the second server 120 when receiving the authentication token.

The second server 120 may check validity of the token in S260. The second server 120 may receive the vehicle and account information from the apparatus for controlling a vehicle, and may check whether the authentication token is valid.

The second server 120 may transmit policy information for the FIDO registration to the apparatus for controlling a vehicle in S265. The policy information may be data related to a criterion determined when registering the FIDO. The second server 120 may transmit the policy information to the apparatus for controlling a vehicle when the authentication token is valid.

The apparatus for controlling a vehicle may authenticate the user fingerprint in S270. The apparatus for controlling a vehicle may authenticate the user fingerprint when receiving the policy information. The apparatus for controlling a vehicle may receive the user fingerprint by using the fingerprint recognition module.

The apparatus for controlling a vehicle may generate the information on the FIDO registration in S275. The apparatus for controlling a vehicle may generate the information on the FIDO registration by using the authenticated user fingerprint.

The apparatus for controlling a vehicle may check whether a driver is seated by using an occupancy sensor of the driver's seat, and may then transmit the confirmed occupancy in S280. The occupancy sensor that detects whether the corresponding seat is occupied may be disposed in each seat of the vehicle 105. The apparatus for controlling a vehicle may check whether the driver is seated on the driver's seat by using the occupancy sensor of the driver's seat. The apparatus for controlling a vehicle may transmit the information on the FIDO registration to the second server 120 when the driver's occupancy on the driver's seat is confirmed.

The second server 120 may register the target vehicle and account information in the FIDO in S285. The second server 120 may register the target vehicle and account information in the FIDO based on the received information on the FIDO registration.

The apparatus for controlling a vehicle may activate the use of the FIDO by the account in which the fingerprint is registered in S290. The apparatus for controlling a vehicle may use the user fingerprint used for the authentication as the registered account when generating the information on the FIDO registration. The apparatus for controlling a vehicle may set the registered account to authenticate the FIDO by using the registered account.

The apparatus for controlling a vehicle may complete the FIDO registration, and may notify the user of the same in S295. The apparatus for controlling a vehicle may notify the user that the FIDO registration is completed by displaying the same on the display of the vehicle 105.

Figure 3:
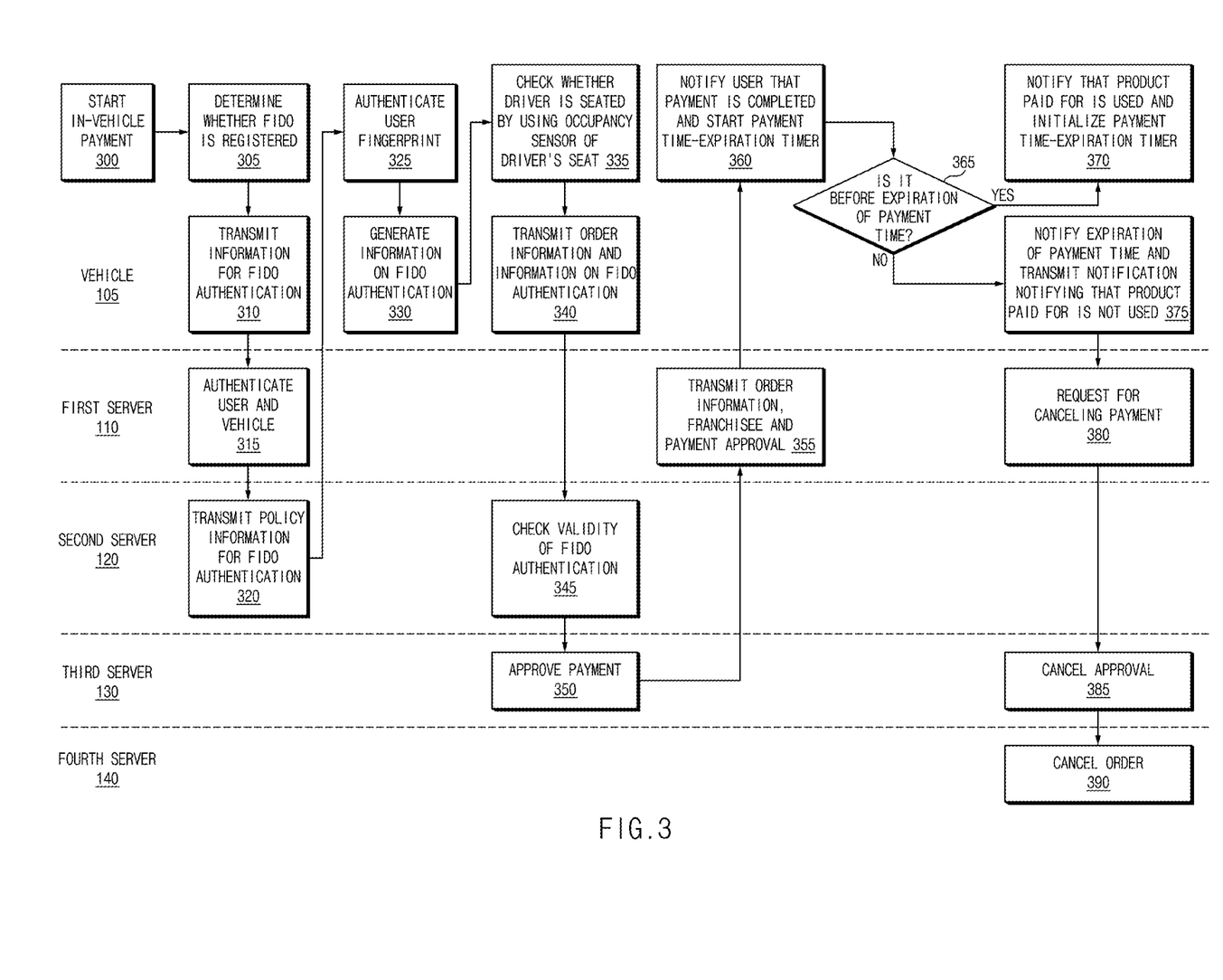
FIG. 3 is a flowchart showing a process in which the apparatus for controlling a vehicle authenticates the FIDO according to an embodiment of the present disclosure.

FIG. 3 is a flowchart showing a process in which the apparatus for controlling a vehicle authenticates the FIDO according to an embodiment of the present disclosure.

The apparatus for controlling a vehicle may start the in-vehicle payment in S300. The apparatus for controlling a vehicle may start the payment performed in the vehicle 105 to allow the user to use the service such as parking, refueling or charging an electric vehicle. For example, the driver driving an electric vehicle may start a payment for a charging fee in advance before the electric vehicle arrives at a charging station.

The apparatus for controlling a vehicle may determine whether the FIDO is registered in S305. The apparatus for controlling a vehicle may check whether the target vehicle and account information are registered in the FIDO.

The apparatus for controlling a vehicle may transmit the vehicle information for the FIDO authentication to the first server 110 in S310. The apparatus for controlling a vehicle may confirm that the FIDO is registered, and then transmit the vehicle information to the first server 110.

The first server 110 may authenticate the user and the vehicle 105 in S315. The first server 110 may check whether the user and the vehicle 105 are the user and the vehicle 105 which are registered in the FIDO. The first server 110 may transmit an authentication result of the user and vehicle 105 to the second server 120.

The second server 120 may transmit the policy information for the FIDO authentication to the apparatus for controlling a vehicle in S320. The second server 120 may transmit the policy information to the apparatus for controlling a vehicle when receiving the authentication result of the user and vehicle 105.

The apparatus for controlling a vehicle may authenticate the user fingerprint in S325. The apparatus for controlling a vehicle may authenticate the user fingerprint when receiving the policy information. The apparatus for controlling a vehicle may receive the user fingerprint by using the fingerprint recognition module.

The apparatus for controlling a vehicle may generate information on the FIDO authentication in S330. The apparatus for controlling a vehicle may generate the information on the FIDO authentication when the user fingerprint is authenticated.

The apparatus for controlling a vehicle may check whether the driver is seated by using the occupancy sensor of the driver's seat in S335. The apparatus for controlling a vehicle may check whether the driver is seated on the driver's seat by using the occupancy sensor of the driver's seat.

The apparatus for controlling a vehicle may transmit order information and the information on the FIDO authentication to the second server 120 in S340. The apparatus for controlling a vehicle may transmit the order information and the information on the FIDO authentication to the second server 120 when the driver is confirmed to be seated on the driver's seat. The apparatus for controlling a vehicle may authenticate the user fingerprint to detect fraud during the payment by using the FIDO authentication, may then determine whether the driver's seat is occupied before transmitting the same to the center server, and may transmit that the fingerprint authentication is successful to the center server when the driver is confirmed to be seated on the driver's seat.

The second server 120 may check validity of the FIDO authentication in S345. The second server 120 may transmit a result of whether the FIDO authentication is valid to the third server 130.

The third server 130 may approve the payment in S350. The third server 130 may transmit a result of the payment approval to the first server 110.

The first server 110 may transmit the order information, a franchisee and the payment approval to the apparatus for controlling a vehicle in S355. The first server 110 may transmit the order information, the franchisee and the payment approval to the apparatus for controlling a vehicle when receiving the result of the payment approval in S355. For example, the driver driving an electric vehicle may complete a payment process for the charging fee in advance before the electric vehicle arrives at the charging station.

The apparatus for controlling a vehicle may notify the user that the payment is completed and start a payment time-expiration timer in S360. The apparatus for controlling a vehicle may indicate that the payment is completed on the display of the vehicle 105. The apparatus for controlling a vehicle may notify the user that the payment is completed through a speaker of the vehicle 105. The payment time-expiration tinier may be a timer indicating time remaining until the payment approved in the vehicle is actually used. The payment may be canceled when the payment time expires. The apparatus for controlling a vehicle may use a timeout function such as the payment time-expiration timer to automatically cancel the payment when the payment approved in the vehicle is not actually used. The apparatus for controlling a vehicle may display the payment time-expiration timer on the display of the vehicle 105.

The apparatus for controlling a vehicle may check whether it is before the expiration of the payment time in S365. For example, the driver driving an electric vehicle may complete the payment process for the charging fee in advance before the electric vehicle arrives at the charging station. However, the timeout may occur in which the payment time at the charging station expires because there is no charger for charging the electric vehicle at the charging station when the electric vehicle arrives at the charging station. In general, the driver may park the electric vehicle around the charging station or move the vehicle to another charging station when it is impossible to start charging of the electric vehicle immediately due to a long charging time. In this case, it may be necessary to automatically cancel the payment due to the timeout of the previous payment in advance. The apparatus for controlling a vehicle may proceed with S370 when it is before the expiration of the payment time (i.e., YES in S365). The apparatus for controlling a vehicle may proceed with S375 when the payment time expires (i.e., No in S365).

The apparatus for controlling a vehicle may notify that a product paid for is used and initialize the payment time-expiration timer in S370. A retailer or franchisee of a service or product may transmit information that the use of the service or product is completed to the apparatus for controlling a vehicle when their use is completed. The apparatus for controlling a vehicle may determine whether the service or product paid for is actually used based on receiving the information that their use is completed. The apparatus for controlling a vehicle may reset the payment timeout function.

The apparatus for controlling a vehicle may notify the expiration of the payment time and transmit a notification notifying that the product paid for is not used in S375. The apparatus for controlling a vehicle may display a notification that the payment time expires on the display of the vehicle 105. The apparatus for controlling a vehicle may transmit a notification that the product paid for is not used to the first server 110.

The first server 110 may transmit a request for canceling the payment to the third server 130 in S380. The first server 110 may transmit the request for canceling the payment to the third server 130 when receiving the notification that the product paid for is not used.

The third server 130 may transmit approval cancellation to a fourth server 140 in S385. The fourth server 140 may be a server of a retailer or franchisee of the service or product. The third server 130 may transmit the approval cancellation to the fourth server 140 when receiving the request for canceling the payment.

The fourth server 140 may cancel the order in S390.

Figure 4:
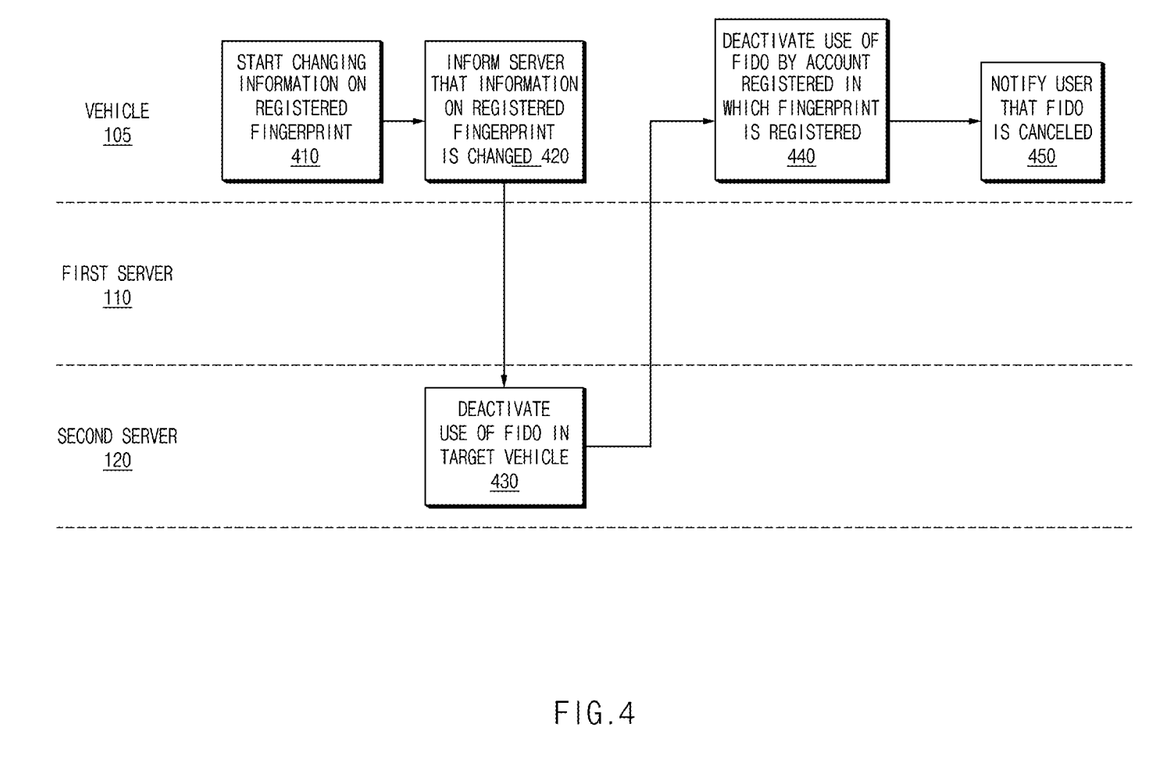
FIG. 4 is a flowchart showing a process in which the apparatus for controlling a vehicle initializes the FIDO according to an embodiment of the present disclosure.

FIG. 4 is a flowchart showing a process in which the apparatus for controlling a vehicle initializes the FIDO according to an embodiment of the present disclosure.

The apparatus for controlling a vehicle may start changing the information on the registered fingerprint in S410. The apparatus for controlling a vehicle may change a state of the fingerprint registered in the vehicle 105. The apparatus for controlling a vehicle may delete the fingerprint registered in the vehicle 105. The apparatus for controlling a vehicle may register the new fingerprint in the vehicle 105. For example, the head unit of the vehicle 105 may delete all the information on the registered fingerprint when a charging module or the fingerprint recognition module is replaced due to an accident occurring while the vehicle 105 is driven or the fingerprint recognition module of the vehicle 105 is broken or damaged.

The apparatus for controlling a vehicle may inform the server that the information on the registered fingerprint is changed in S420. For example, the information on the FIDO registration may be initialized when the charging module or the fingerprint recognition module is replaced due to the accident occurring while the vehicle 105 is driven or the fingerprint recognition module of the vehicle 105 is broken or damaged. The apparatus for controlling a vehicle may transmit that the information on the fingerprint registered in the vehicle 105 is changed to the second server 120.

The second server 120 may deactivate the use of the FIDO in the target vehicle 105 in S430. The second server 120 may transmit an instruction to deactivate the use of the FIDO based on the information on the changed fingerprint to the apparatus for controlling a vehicle when receiving the information that the registered fingerprint is changed.

The apparatus for controlling a vehicle may deactivate the use of the FIDO by the account in which the fingerprint used is registered in S440. The apparatus for controlling a vehicle may deactivate the use of the FIDO by the account in which the fingerprint is registered when receiving the instruction to deactivate the use of the FIDO from the second server 120.

The apparatus for controlling a vehicle may notify the user that the FIDO is canceled in S450. The apparatus for controlling a vehicle may notify the user that the FIDO registration is cancelled. The apparatus for controlling a vehicle may display that the FIDO registration is canceled on the display of the vehicle 105.

Figure 5:
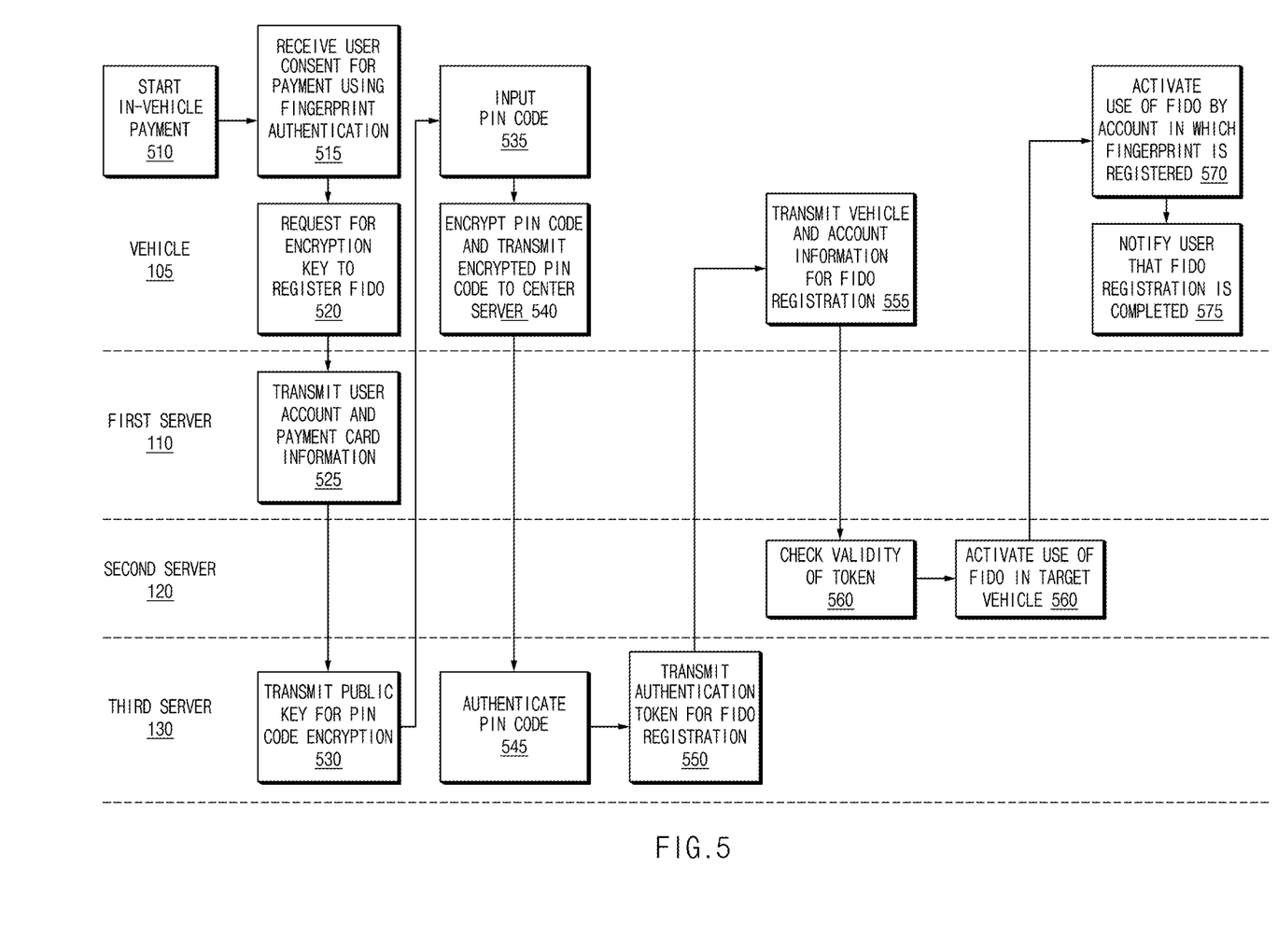
FIG. 5 is a flowchart showing a process in which the apparatus for controlling a vehicle re-authenticates the FIDO according to an embodiment of the present disclosure.

FIG. 5 is a flowchart showing a process in which the apparatus for controlling a vehicle re-authenticates the FIDO according to an embodiment of the present disclosure.

The apparatus for controlling a vehicle may start the in-vehicle payment in S510. The apparatus for controlling a vehicle may start the payment performed in the vehicle 105 to allow the user to use the service such as parking, refueling or charging an electric vehicle. The user fingerprint may be registered in the apparatus for controlling a vehicle in advance.

The apparatus for controlling a vehicle may receive the user consent for the payment using the fingerprint authentication in S515. The apparatus for controlling a vehicle may obtain the user consent as to whether or not to proceed with the payment using the fingerprint registered in advance.

The apparatus for controlling a vehicle may request for the encryption key to register the FIDO in S520. The apparatus for controlling a vehicle may transmit the request for the encryption key to the first server 110.

The first server 110 may transmit the user account and the payment card information to the third server 130 in S525.

The first server 110 may transmit the user account and the payment card information when receiving the request for the encryption key.

The third server 130 may transmit the public key for the pin code encryption to the apparatus for controlling a vehicle in S530. The third server 130 may transmit the public key when receiving the user account and the payment card information.

The apparatus for controlling a vehicle may receive the pin code in S535.

The apparatus for controlling a vehicle may encrypt the pin code, and may transmit the encrypted pin code to the center server in S540. The apparatus for controlling a vehicle may transmit the pin code encrypted by using the public key to the third server 130.

The third server 130 may authenticate the pin code in S545. The third server 130 may authenticate the pin code encrypted by using the public key.

The third server 130 may transmit the authentication token for the FIDO registration to the apparatus for controlling a vehicle in S550.

The apparatus for controlling a vehicle may transmit the vehicle and account information for the FIDO registration to the second server 120 in S555.

The second server 120 may check the validity of the token in S560.

The second server 120 may activate the use of the FIDO in the target vehicle 105 in S565. The second server 120 may transmit the signal activating the use of the FIDO in the vehicle 105 to the apparatus for controlling a vehicle when it is confirmed that the authentication token is valid.

The apparatus for controlling a vehicle may activate the use of the FIDO by the account in which the user fingerprint is registered in S570. The apparatus for controlling a vehicle may transmit the vehicle and account information to the FIDO authentication server to activate the use of the FIDO by the account in which the fingerprint is registered, when the fingerprint is registered in advance.

The apparatus for controlling a vehicle may notify the user that the FIDO registration is completed in S575. The apparatus for controlling a vehicle may display that the FIDO is re-authenticated on the display of the vehicle 105.

Figure 6:
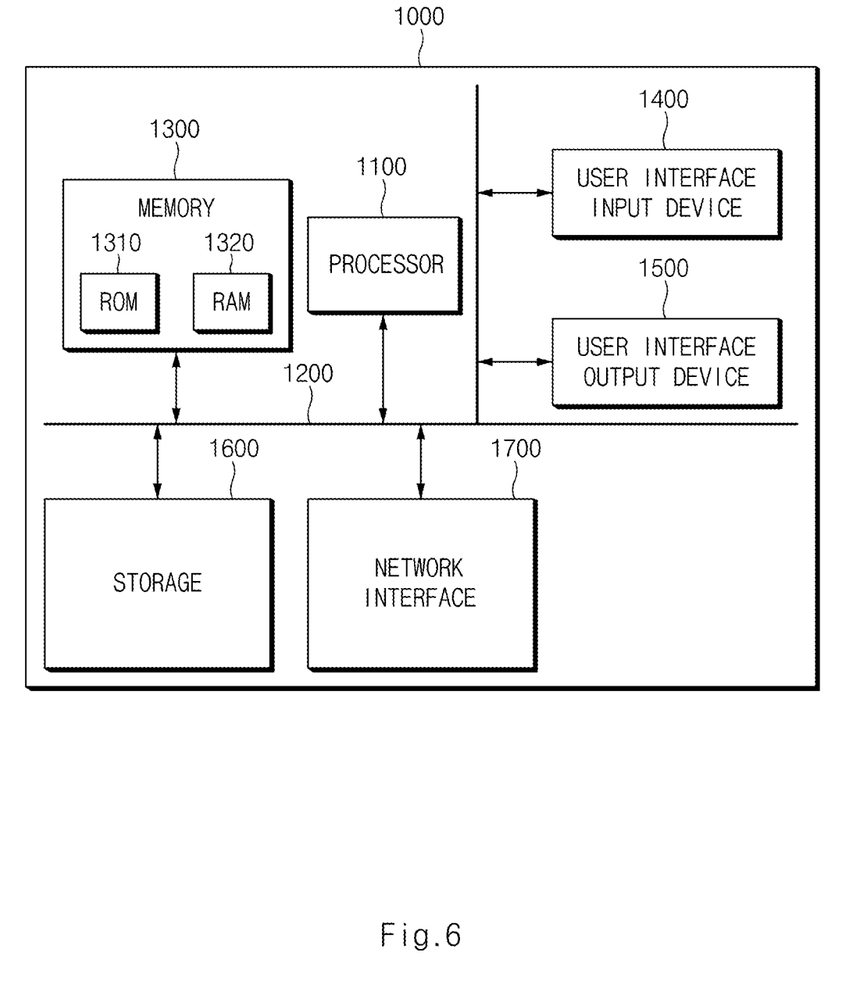
FIG. 6 shows a computing system according to an embodiment of the present disclosure.

FIG. 6 shows a computing system according to an embodiment of the present disclosure.

Referring to FIG. 6, a computing system 100 may include at least one processor 1100, a memory 1300, a user interface input device 1400, a user interface output device 1500, a storage 1600 and a network interface 1700, which are connected to one another through a bus 1200.

The processor 1100 may be a semiconductor device executing processing for instructions stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Therefore, a step of a method or algorithm described in connection with the embodiments disclosed in the present disclosure may be directly implemented by a hardware module, a software module or a combination thereof, controlled by the processor 1100. The software module may reside in a random access memory (RAM), a flash memory, a read only memory (ROM), an erasable programming ROM (EPROM), an electrically erasable programming ROM (EEPROM), a register, a hard disk, a detachable disk or a storage medium (i.e., the memory 1300 and/or the storage 1600) such as a compact disk-ROM (CD-ROM).

An exemplary storage medium may be coupled to the processor 1100, and the processor 1100 may read information from the storage medium and write information to the storage medium. Alternatively, the storage medium may also be formed integrally with the processor 1100. The processor and the storage medium may also reside in an application specific integrated circuit (ASIC). The ASIC may also reside in a user terminal. Alternatively, the processor and the storage medium may also reside in the user terminal as individual components.

As set for the above, the present disclosure may provide the technology of performing the user authentication and completing the payment, by using the FIDO authentication, for the user to conveniently proceed with the user authentication and the payment in the vehicle.

In addition, the present disclosure may provide various effects identified directly or indirectly therethrough.

Hereinabove, although the present disclosure has been described with reference to the embodiments and the accompanying drawings, the present disclosure is not limited thereto, and may be variously modified and altered by those skilled in the art to which the present disclosure pertains without departing from the spirit and scope of the present disclosure claimed in the following claims.

What is claimed is:

1. An apparatus for controlling a vehicle, the apparatus comprising:
  a memory;
  a network interface; and
  a processor,
  wherein the processor is configured to:
  check whether a fingerprint recognition module in the vehicle supports fast identity online (FIDO),
  request an encryption key to register the FIDO,
  encrypt an input pin code to transmit the encrypted pin code to a financial information processing server,
  transmit vehicle and account information for the FIDO registration to a FIDO authentication server when receiving an authentication token from the financial information processing server,
  generate information on the FIDO registration when receiving policy information from the FIDO authentication server, and
  transmit the information on the FIDO registration to the FIDO authentication server.

2. The apparatus of claim 1, wherein the processor is configured to check whether a fingerprint recognition function of the vehicle is supported by controller area network (CAN) communication between a head unit, which is included in the vehicle and performs payment, and the fingerprint recognition module.

3. The apparatus of claim 1, wherein the processor is configured to receive a public key from the financial information processing server and encrypt the pin code.

4. The apparatus of claim 1, wherein the processor is configured to:
  receive a user fingerprint by using the fingerprint recognition module and authenticate the user fingerprint when receiving the policy information, and
  generate the information on the FIDO registration by using the user fingerprint.

5. The apparatus of claim 1, wherein the processor is configured to check whether a driver is seated by using an occupancy sensor of the driver's seat and then transmit the information on the FIDO registration to the FIDO authentication server.

6. The apparatus of claim 1, wherein the processor is configured to determine whether the FIDO is registered and transmit order information and information on the MO authentication.

7. The apparatus of claim 1, wherein the processor is configured to notify a user that a payment is completed and start a payment time-expiration timer.

8. The apparatus of claim 7, wherein the processor is configured to transmit a notification notifying that a product paid for is not used when a payment time on the payment-expiration timer expires.

9. The apparatus of claim 1, wherein the processor is configured to:
  inform the FIDO authentication server that the information on the registered fingerprint is changed, and
  deactivate use of the FIDO by a registered account when receiving an instruction to deactivate the use of the FIDO from the FIDO authentication server.

10. The apparatus of claim 1, wherein the processor is configured to transmit the vehicle and account information to the FIDO authentication server to activate use of the FIDO by an account in which the fingerprint is registered, when the fingerprint is registered in advance.

11. A controlling method of a vehicle, the method comprising:
  checking whether a fingerprint recognition module in the vehicle supports fast identity online (FIDO),
  requesting an encryption key to register the FIDO,
  encrypting an input pin code to transmit the encrypted pin code to a financial information processing server,
  transmitting vehicle and account information for the FIDO registration to a FIDO authentication server when receiving an authentication token from the financial information processing server,
  generating information on the FIDO registration when receiving policy information from the FIDO authentication server, and
  transmitting the information on the FIDO registration to the FIDO authentication server.

12. The method of claim 11, wherein checking whether the FIDO is supported includes checking whether a fingerprint recognition function of the vehicle is supported by controller area network (CAN) communication between a head unit, which is included in the vehicle and performs payment, and the fingerprint recognition module.

13. The method of claim 11, wherein encrypting the input pin code to transmit the encrypted pin code to the financial information processing server includes receiving a public key from the financial information processing server and encrypting the pin code.

14. The method of claim 11, wherein generating the information on the FIDO registration includes:
  receiving a user fingerprint by using the fingerprint recognition module and authenticating the user fingerprint when receiving the policy information, and
  generating the information on the FIDO registration by using the user fingerprint.

15. The method of claim 11, wherein transmitting the information on the FIDO registration to the FIDO authentication server includes checking whether a driver is seated by using an occupancy sensor of the driver's seat and then transmitting the information on the FIDO registration to the FIDO authentication server.

16. The method of claim 11, further comprising:
  determining whether the FIDO is registered and transmitting order information and information on the FIDO authentication.

17. The method of claim 11, further comprising: notifying a user that a payment is completed and starting a payment time-expiration timer.

18. The method of claim 17, wherein notifying the user that the payment is completed and the starting the payment time-expiration timer includes transmitting a notification notifying that a product paid for is not used when a payment time expires.

19. The method of claim 11, further comprising:
informing the FIDO authentication server that the information on the registered fingerprint is changed, and
deactivating use of the FIDO by the registered account when receiving an instruction to deactivate the use of the FIDO from the FIDO authentication server.

20. The method of claim 11, further comprising:
transmitting the vehicle and account information to the FIDO authentication server to activate use of the FIDO by an account in which the fingerprint is registered, when the fingerprint is registered in advance.

* * * * *